US011678750B2

(12) United States Patent
Mathur et al.

(10) Patent No.: US 11,678,750 B2
(45) Date of Patent: Jun. 20, 2023

(54) GESTURE OPERATED REFRIGERATED DISPLAY CASE

(71) Applicant: Hill Phoenix, Inc., Conyers, GA (US)

(72) Inventors: Harsha Mathur, Bengaluru (IN); Chetan Gundurao, Bengaluru (IN)

(73) Assignee: Hill Phoenix, Inc., Conyers, GA (US)

( * ) Notice: Subject to any disclaimer, the term of this patent is extended or adjusted under 35 U.S.C. 154(b) by 595 days.

(21) Appl. No.: 16/826,518

(22) Filed: Mar. 23, 2020

(65) Prior Publication Data
US 2021/0289954 A1   Sep. 23, 2021

(51) Int. Cl.
*A47F 3/04* (2006.01)
*F25D 11/00* (2006.01)
*F25D 23/02* (2006.01)

(52) U.S. Cl.
CPC ............ *A47F 3/043* (2013.01); *F25D 11/00* (2013.01); *F25D 23/028* (2013.01); *F25D 2400/361* (2013.01); *F25D 2700/00* (2013.01)

(58) Field of Classification Search
CPC ....... F25D 11/00; F25D 2700/00; G06F 3/017
See application file for complete search history.

(56) References Cited

U.S. PATENT DOCUMENTS

| | | | | |
|---|---|---|---|---|
| 9,814,327 B2 * | 11/2017 | Giulietti | ................ | A47F 3/125 |
| 2013/0099715 A1 * | 4/2013 | Fuhge | ................ | E05F 15/79 |
| | | | | 318/484 |
| 2015/0335175 A1 * | 11/2015 | Choueifati | ............ | A47F 3/0408 |
| | | | | 62/89 |
| 2016/0011668 A1 * | 1/2016 | Gilad-Bachrach | ...... | G06F 3/017 |
| | | | | 345/156 |
| 2021/0041956 A1 * | 2/2021 | Hasburgh | ............. | H05B 47/115 |

FOREIGN PATENT DOCUMENTS

| EP | 3087876 | 11/2016 |
|---|---|---|
| JP | H08308694 | 11/1996 |
| JP | 2014217746 | 11/2014 |
| WO | WO 2014178629 | 11/2014 |

OTHER PUBLICATIONS

International Search Report and Written Opinion in International Appln No. PCT/US2021/023597, dated Jun. 23, 2021, 10 pages.

* cited by examiner

*Primary Examiner* — Lionel Nouketcha
(74) *Attorney, Agent, or Firm* — Fish & Richardson P.C.

(57) ABSTRACT

A display case includes multiple walls that define an inner volume, a door, a door actuator, a gesture sensor, and a controller. The door is transitionable between an open position for access to the inner volume and a closed position. The door actuator is configured to transition the door between the open position and the closed position. The gesture sensor is configured to detect a gesture performed by a user. The controller includes a processing circuit configured to obtain sensor data from the gesture sensor that indicates the gesture performed by the user. The processing circuit is further configured to determine if the user has performed a reference gesture using the sensor data. The processing circuit is further configured to operate the door actuator to transition the door between the open position and the closed position in response to determining that the user has performed the reference gesture.

30 Claims, 10 Drawing Sheets

GESTURE OPERATED REFRIGERATED DISPLAY CASE

BACKGROUND

Typically, a refrigerated display case has several doors which provide access to products located on shelves in a single refrigerated zone. While products may be separated on shelves according to which door they are proximate to, they may be similarly cooled within the refrigerated zone. A user or customer may manually open the doors to access the products that are located on the shelves.

SUMMARY

One implementation of the present disclosure is a display case. The display case includes multiple walls that define an inner volume, a door, a door actuator, a gesture sensor, and a controller, according to some embodiments. The door is transitionable between an open position for access to the inner volume and a closed position, according to some embodiments. The door actuator is configured to transition the door between the open position and the closed position, according to some embodiments. The gesture sensor is configured to detect a gesture performed by a user, according to some embodiments. The controller includes a processing circuit, according to some embodiments. The processing circuit is configured to obtain sensor data from the gesture sensor that indicates the gesture performed by the user, according to some embodiments. The processing circuit is further configured to determine if the user has performed a reference gesture using the sensor data, according to some embodiments. The processing circuit is further configured to operate the door actuator to transition the door between the open position and the closed position in response to determining that the user has performed the reference gesture, according to some embodiments.

In some embodiments, the gesture sensor is a 3d gesture sensor, a capacitive proximity sensor, or a camera and an infrared sensor. In some embodiments, the door actuator is an electric actuator or an electric motor.

In some embodiments, the processing circuit is configured to compare the gesture detected by the gesture sensor to the reference gesture to determine if the user has performed the reference gesture.

In some embodiments, comparing the gesture detected by the gesture sensor to the reference gesture includes comparing the sensor data from the gesture sensor to sensor data associated with the reference gesture to determine if the user has performed the reference gesture.

In some embodiments, the processing circuit is configured to determine if the user has performed a door opening gesture using the sensor data and a door opening reference gesture. In some embodiments, the processing circuit is configured to determine if the user has performed a door closing gesture using the sensor data and a door closing reference gesture. In some embodiments, the processing circuit is configured to operate the door actuator to transition the door into the open position in response to determining that the user has performed the door opening reference gesture. In some embodiments, the processing circuit is configured to operate the door actuator to transition the door into the closed position in response to determining that the user has performed the door closing reference gesture.

In some embodiments, the display case is a refrigerated display case including a refrigeration apparatus. In some embodiments, the controller is configured to operate the refrigeration apparatus to provide cooling to the inner volume.

In some embodiments, the processing circuit is configured to automatically operate the door actuator to transition the door into the closed position in response to the door being in the open position for a threshold amount of time.

Another implementation of the present disclosure is a gesture-operated display case system. In some embodiments, the gesture-operated display case system includes a display case and a controller. In some embodiments, the display case includes multiple walls, a door, a door actuator, and a gesture sensor. In some embodiments, the multiple walls define an inner volume. In some embodiments, the door is transitionable between an open position for access to the inner volume and a closed position. In some embodiments, the door actuator is configured to transition the door between the open position and the closed position. In some embodiments, the gesture sensor is configured to detect a gesture performed by a user. In some embodiments, the controller includes a processing circuit. In some embodiments, the processing circuit is configured to obtain sensor data from the gesture sensor that indicates the gesture performed by the user. In some embodiments, the processing circuit is configured to determine if the user has performed a reference gesture using the sensor data. In some embodiments, the processing circuit is configured to operate the door actuator to transition the door between the open position and the closed position in response to determining that the user has performed the reference gesture.

In some embodiments, the gesture sensor is a 3d gesture sensor, a capacitive proximity sensor, or a camera and an infrared sensor. In some embodiments, the door actuator is an electric actuator or an electric motor.

In some embodiments, the processing circuit is configured to compare the gesture detected by the gesture sensor to the reference gesture to determine if the user has performed the reference gesture.

In some embodiments, comparing the gesture detected by the gesture sensor to the reference gesture includes comparing the sensor data from the gesture sensor to sensor data associated with the reference gesture to determine if the user has performed the reference gesture.

In some embodiments, the processing circuit is configured to determine if the user has performed a door opening gesture using the sensor data and a door opening reference gesture. In some embodiments, the processing circuit is configured to determine if the user has performed a door closing gesture using the sensor data and a door closing reference gesture. In some embodiments, the processing circuit is configured to operate the door actuator to transition the door into the open position in response to determining that the user has performed the door opening reference gesture. In some embodiments, the processing circuit is configured to operate the door actuator to transition the door into the closed position in response to determining that the user has performed the door closing reference gesture.

In some embodiments, the display case is a refrigerated display case including a refrigeration apparatus. In some embodiments, the controller is configured to operate the refrigeration apparatus to provide cooling to the inner volume.

In some embodiments, the processing circuit is configured to automatically operate the door actuator to transition the door into the closed position in response to the door being in the open position for a threshold amount of time.

Another implementation of the present disclosure is a method for providing access to an inner volume of a display case based on user gestures, according to some embodiments. In some embodiments, the method includes obtaining sensor data that indicates a gesture performed by a user. In some embodiments, the method includes determining if the user has performed a reference gesture using the sensor data. In some embodiments, the method includes operating a door actuator to transition a door of the display case between an open position and a closed position in response to determining that the user has performed the reference gesture.

In some embodiments, the sensor data is obtained from a gesture sensor. In some embodiments, the gesture sensor is a 3d gesture sensor, a capacitive proximity sensor, or a camera and an infrared sensor.

In some embodiments, determining if the user has performed the reference gesture using the sensor data includes comparing the gesture detected by the gesture sensor to the reference gesture to determine if the user has performed the reference gesture.

In some embodiments, determining if the user has performed the reference gesture using the sensor data includes comparing the sensor data from the gesture sensor to sensor data associated with the reference gesture to determine if the user has performed the reference gesture.

In some embodiments, the method includes determining if the user has performed a door opening gesture using the sensor data and a door opening reference gesture. In some embodiments, the method includes determining if the user has performed a door closing gesture using the sensor data and a door closing reference gesture. In some embodiments, the method includes operating the door actuator to transition the door into the open position in response to determining that the user has performed the door opening reference gesture. In some embodiments, the method includes operating the door actuator to transition the door into the closed position in response to determining that the user has performed the door closing reference gesture.

In some embodiments, the method includes automatically operating the door actuator to transition the door into the closed position in response to the door being in the open position for a threshold amount of time.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a display case (e.g., a refrigerated display case) can include sidewalls and one or more doors that facilitate access to an inner volume defined by the sidewalls. The doors may include handles so that a customer can manually open the doors to access the inner volume. The display case can include shelves and product may be stored on the shelves so that the customer can access the product when the door is opened. The door may be automatically transitioned by one or more door actuators (e.g., electric motors) between an open position and a closed position to facilitate access to the inner volume. The display case can also include one or more gesture sensors that are configured to monitor an area proximate the display case and detect gestures performed by the customer. The gesture sensors may generate sensor data and provide the sensor data to a controller of the display case.

The controller may receive the sensor data indicating a gesture performed by the customer and can compare the gesture to one or more reference gestures. The one or more reference gestures can include a door opening gesture and a door closing gesture. If the gesture performed by the customer matches the door opening gesture, the controller may operate the door actuator to open the door (e.g., to transition the door into the open position). If the gesture performed by the customer matches the door closing gesture, the controller may operate the door actuator to close the door (e.g., to transition the door into the closed position).

The controller may also monitor an amount of time that the door remains in the open position. For example, the controller may obtain sensor data from a door sensor that indicates a position of the door. In other embodiments, the controller may record a time at which the door is transitioned into the open position and use a current time to determine an amount of elapsed time that the door has been maintained in the open position. If the amount of time that the door remains in the open position exceeds a threshold amount of time, the controller may operate (e.g., by generating control signals) the door actuators to close the door.

Advantageously, the systems and methods described herein facilitate improved and user friendly access to an inner volume of a display case. The systems and methods can be specifically helpful for handicapped customers, elderly customers, or children who may have difficulty manually opening the doors of the display case. Advantageously, the systems and methods described herein use gesture-recognition to automatically open the door to provide customers that may have difficulty manually opening the doors with access to the inner volume of the display case.

Temperature Controlled Display Case

Figure 1:
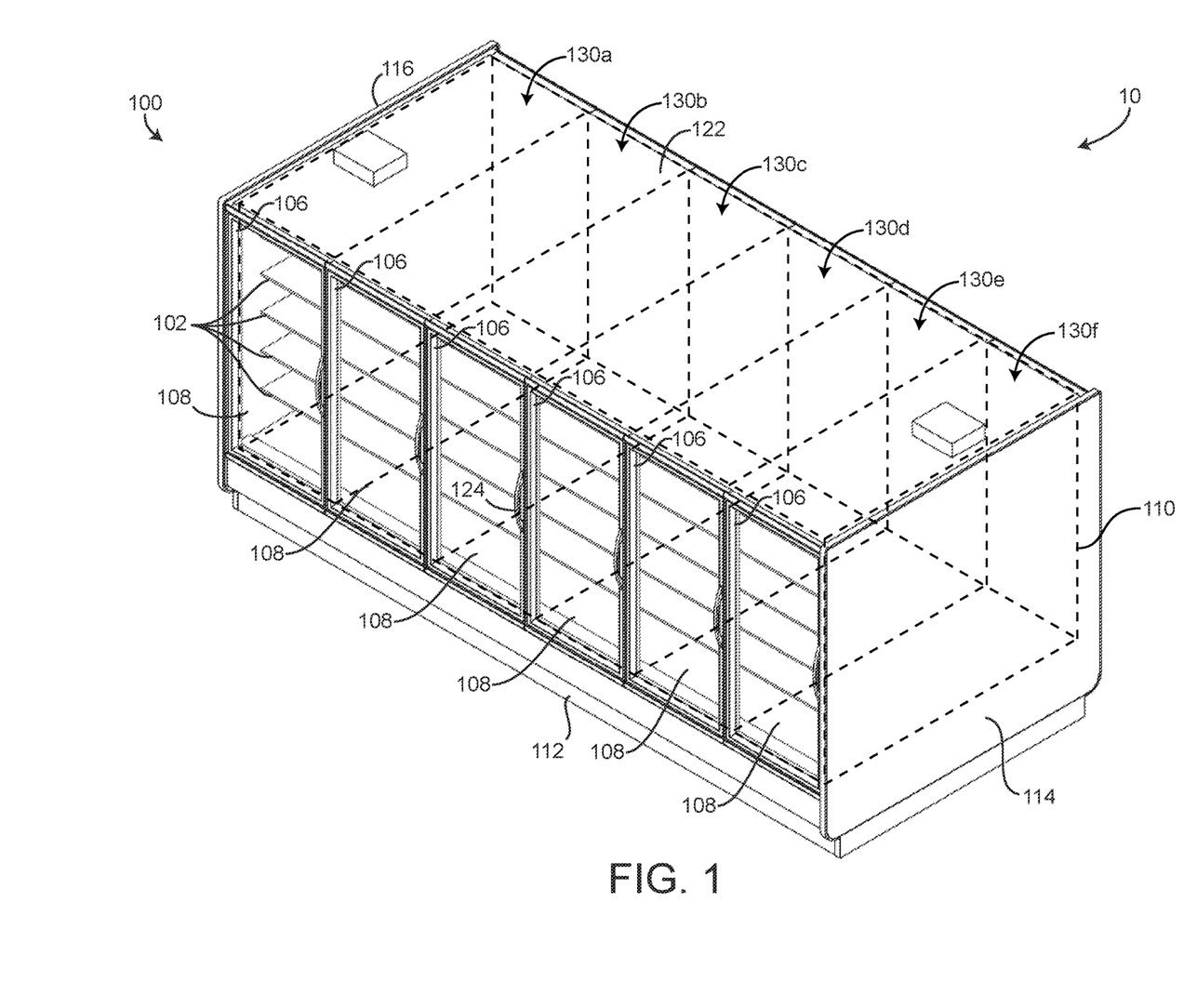
FIG. 1 is a perspective view of a temperature-controlled case, according to some embodiments.
Figure 2:
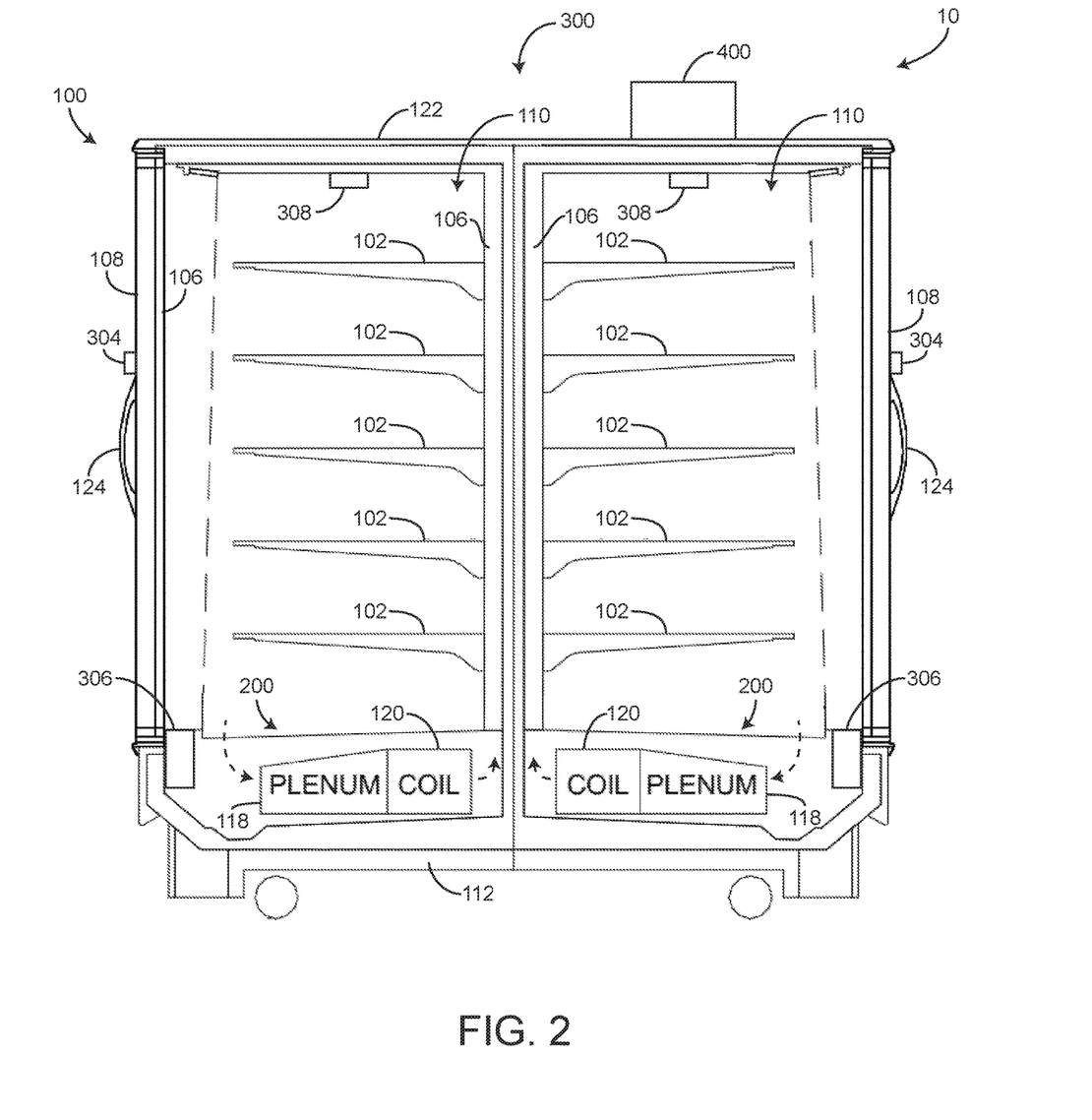
FIG. 2 is side view of the temperature-controlled case, according to some embodiments.

Referring to FIGS. 1-2, a display case system 10 includes a refrigerated display case, a display case, a temperature controlled case, etc., shown as display case 100 is shown, according to some embodiments. Display case system 10 can also include a controller 400. In some embodiments, controller 400 is a component of display case 100. Display case 100 includes a base, a frame, a carriage, a main structure, a floor, etc., shown as base 112. Display case 100 also includes multiple sidewalls, walls, planar structures, planar members, support members, etc., shown as sidewall 116 and sidewall 114. Sidewall 114 and sidewall 116 may be positioned a distance apart from each other along a longitudinal axis of display case 100.

Display case 100 also includes a top wall, a top surface, a ceiling, etc., shown as upper wall 122. Upper wall 122 may be fixedly coupled with sidewall 114 and sidewall 116. Upper wall 122, sidewall 114 and sidewall 116 may be sealingly coupled with each other to facilitate preventing the escape of air from within display case 100.

Display case 100 also includes multiple doors, windows, access points, openings, etc., shown as doors 108. Display case 100 can include a first set of doors 108 along a first side of display case 100 and a second set of doors 108 along a second or opposite side of display case 100. Doors 108 can be hingedly coupled between upper wall 122 and base 112, or may be slidable (e.g., configured to translate along a track to facilitate access to an interior of display case 100). Doors 108 may facilitate access of an interior volume or conditioned space within display case 100 (e.g., inner volume 110 as described herein). In other embodiments, display case 100 only includes a first set of doors 108 along one side of display case 100, and an opposite side of display case 100 is a wall member (e.g., similar to sidewall 114 and/or sidewall 116).

Sidewall 114, sidewall 116, base 112, and upper wall 122 cooperatively define an inner volume 110. Inner volume 110 can be an interior volume of display case 100 that is temperature controlled (e.g., cooled) by a cooling apparatus or a cooling system, shown as refrigeration apparatus 200 of display case 100. Refrigeration apparatus 200 includes a plenum 118 and a coil 120 that are configured to operate to draw air from inner volume 110, cool the air, and discharge or output cooled air to inner volume 110. Coil 120 may be or include a heat exchanger that is configured to circulate a coolant and pass air over the heat exchanger to decrease a temperature of the air (e.g., to cool the air). The cool air is then discharged to inner volume 110 to maintain a desired temperature within inner volume 110.

Referring still to FIGS. 1-2, display case 100 can include a controller 400 and a temperature sensor 308. Controller 400 is configured to generate control signals for refrigeration apparatus 200 so that refrigeration apparatus 200 operates to achieve a desired amount of cooling or a desired temperature within display case 100. Controller 400 can receive values of a current temperature within display case 100 from temperature sensor 308. In this way, controller 400 may operate refrigeration apparatus 200 using a closed-loop control scheme, with sensor data obtained from temperature sensor 308 functioning as feedback.

Referring particularly to FIG. 2, display case 100 can include multiple shelves 102. Shelves 102 may extend from a rear wall, or a central member 106 of display case 100. Shelves 102 can be configured to support a product (e.g., containers, dairy products, food items, etc.) so that when a customer accesses inner volume 110 of display case 100, the customer may also access the product on shelves 102. In some embodiments, shelves 102 are spaced apart along a vertical direction. Shelves 102 may also fixedly couple or be supported by sidewall 114 and/or sidewall 116.

Referring again to FIG. 1, display case 100 can be modular, including multiple sections or multiple refrigerated display cases 100 that are positioned along base 112. Inner volume 110 can include multiple sub-volumes 130a-130f (e.g., six) that each include shelves 102 configured to store product. Sub-volumes 130a-130f can each include a corresponding door 108 and/or a corresponding refrigeration apparatus 200. In this way, a temperature or cooling of each sub-volume 130a-130f can be independently controlled by controller 400 through operation of refrigeration apparatuses 200.

Gesture Operated Display Case

Referring particularly to FIG. 2, display case 100 can include a sensor, a detector, a camera, a 3d gesture sensor, a capacitive proximity sensor, an infrared sensor, etc., shown as gesture sensor 304. Display case 100 also includes an actuator, an electric motor, etc., shown as door actuator 306. Each door 108 can include a corresponding door actuator 306. Door actuator 306 is configured to consume electrical energy and operate the corresponding door 108 to transition the corresponding door 108 into an open position (e.g., so that inner volume 110, shelves 102, or product that is placed on shelves 102 may be accessed by a customer). Door actuator 306 may be an electric motor or an electric driver that is configured to transition a corresponding door 108 or a corresponding set of doors 108 between a closed position (e.g., a fully closed position) and an open position (e.g., a fully open position), or a position between the open position and the closed position. Door actuator 306 can an electric motor that is configured to open door 108 by slowly increasing motor speed until door 108 is opened to its maximum limit (e.g., the open position).

Controller 400 can receive signals from gesture sensor 304 and may identify if a customer has performed a particular gesture. Controller 400 can determine a corresponding action (e.g., to open the door, close the door, etc.) based on the gesture that is detected or identified based on the signals received from gesture sensor 304. Controller 400 can generate control signals for actuator(s) 306 to perform the corresponding action and may provide the control signals to actuator(s) 306 to perform the corresponding action (e.g., opening the corresponding door 108, closing the corresponding door 108, etc.).

Figure 3:
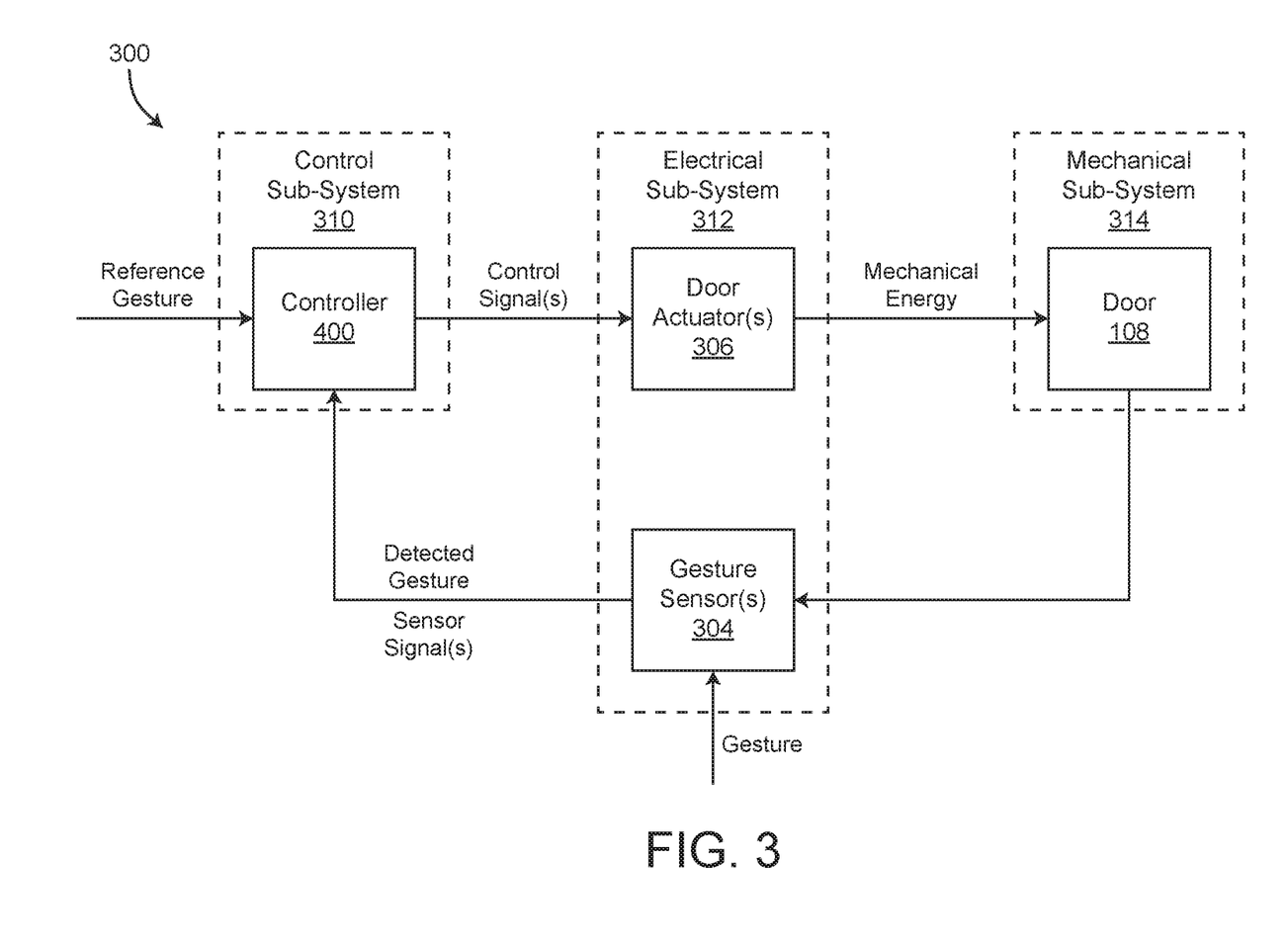
FIG. 3 is a block diagram of a control system for opening or closing a door of a display case based on a customer gesture, according to some embodiments.

Referring particularly to FIG. 3, a control system 300 (e.g., a gesture detection and door control system, a gesture detection system, etc.) for display case 100 is shown. Control system 300 includes controller 400, actuator(s) 306, gesture sensor(s) 304, and door 108. Controller 400 may define a control sub-system 310. Actuator(s) 306 and gesture sensor(s) 304 define an electrical sub-system 312. Door 108 may define a mechanical sub-system 314.

Gesture sensor(s) 304 are positioned on doors 108 (e.g., outwards on a handle 124 of doors 108, outwards on an exterior surface of doors 108, etc.) and are configured to detect or obtain sensor information regarding a gesture made by a customer. Gesture sensor(s) 304 may detect the gesture or generate sensor data/signal(s) indicative of the gesture. Gesture sensor(s) 304 provide the detected gesture or the sensor signal(s) to controller 400 for processing. Controller 400 can use the detected gesture obtained by gesture sensor(s) 304 and compare the detected gesture to a reference gesture to determine if the detected gesture matches the reference gesture. In other embodiments, controller 400 uses the sensor signal(s) to detect the gesture. Controller 400 may identify an action that corresponds to the detected gesture or the reference gesture if the detected gesture matches the reference gesture and can generate control signals for actuator(s) 306. Actuator(s) 306 receive the control signal(s) and generate mechanical energy for door 108 to perform the action. For example, the action may include opening the door, and actuator(s) 106 can receive the control signals from controller 400 and use the control signal(s) to open door 108.

Figure 4:
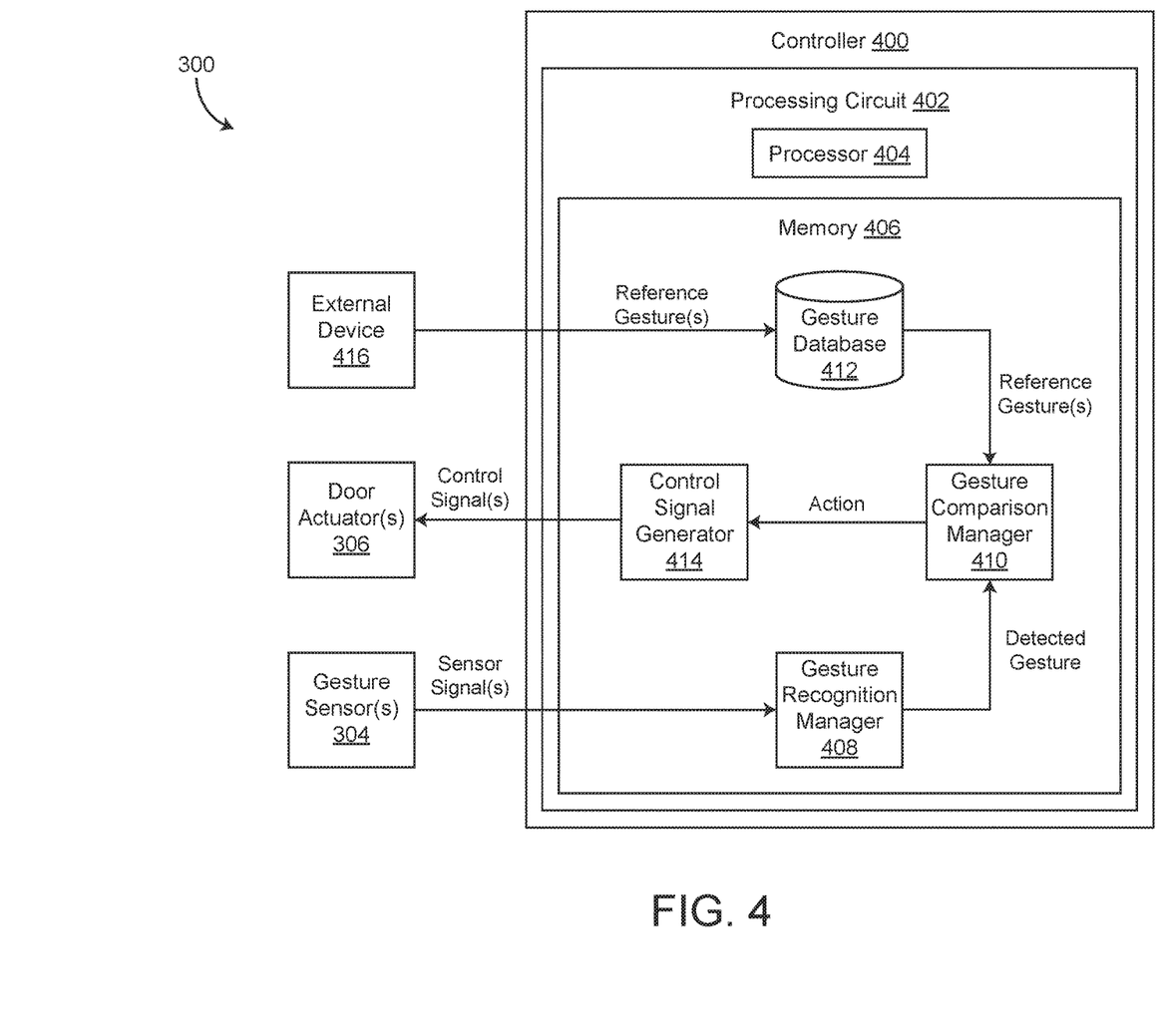
FIG. 4 is a block diagram of the control system of FIG. 3, showing the controller in greater detail, according to some embodiments.

Referring particularly to FIG. 4, a portion of control system 300 is shown that illustrates the functionality of controller 400 in greater detail. Controller 400 includes a processing circuit 402, a processor 404, and memory 406. Processing circuit 402 can be communicably connected to a communications interface such that processing circuit 402 and the various components thereof can send and receive data via the communications interface. Processor 404 can be implemented as a general purpose processor, an application specific integrated circuit (ASIC), one or more field programmable gate arrays (FPGAs), a group of processing components, or other suitable electronic processing components.

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to some embodiments, memory 406 is communicably connected to processor 404 via processing circuit 402 and includes computer code for executing (e.g., by processing circuit 402 and/or processor 404) one or more processes described herein.

Referring still to FIG. 4, memory 406 is shown to include a gesture recognition manager 408, a gesture comparison manager 410, a gesture database 412, and a control signal generator 414. Controller 400 is communicably coupled (e.g., wired, wirelessly, or a combination thereof) with actuator(s) 306, sensor(s) 304, and an external device 416.

Gesture recognition manager 408 is configured to receive sensor signal(s) from gesture sensor(s) 304 that indicate a gesture performed by a customer in proximity to display case 100. In some embodiments, gesture recognition manager 408 is configured to analyze the sensor signal(s) to detect whether a gesture has been performed in proximity to gesture sensor(s) 304. In some embodiments, gesture recognition manager 408 is configured to detect an activation gesture or to use sensor signal(s) from gesture sensor(s) 304 to determine if a customer is in proximity to display case 100. Gesture recognition manager 408 can record or store (e.g., in a buffer) subsequent sensor signal(s) or sensor data in response to detecting the activation gesture or detecting that the customer is in proximity to display case 100.

Gesture recognition manager 408 uses the sensor signal(s) and outputs a detected gesture to gesture comparison manager 410. In some embodiments, the detected gesture are sensor signal(s) obtained from a time period over which the customer performs a gesture. Gesture comparison manager 410 can receive the detected gesture and compare the detected gesture to one or more reference gestures obtained from gesture database 412. Gesture database 412 can include multiple patterns, typical sensor signal(s), expected sensor signal(s), etc., for different gestures that controller 400 is configured to detect to operate display case 100.

Gesture comparison manager 410 can compare the detected gesture to each of the reference gesture(s) stored in gesture database 412 to determine if the detected gesture matches any of the reference gesture(s). If the detected gesture matches one of the reference gesture(s), gesture comparison manager 410 can output an action to control signal generator 414 that corresponds to the reference gesture which the detected gesture matches. For example, gesture comparison manager 410 can retrieve the action from gesture database 412 that corresponds to the reference gesture which the detected gesture matches.

Gesture comparison manager 410 provides the action to control signal generator 414 in response to the detected gesture matching one of the reference gesture(s). Control signal generator 414 can generate control signal(s) for actuator(s) 306 based on the action. For example, if the action indicates that door 108 should be opened, control signal generator 414 can generate control signal(s) for actuator(s) 306 so that actuator(s) 306 operate to open a corresponding door 108.

Gesture database 412 can obtain reference gesture(s) from external device 416. For example, the reference gesture(s) can be provided to gesture database 412 when a control program is uploaded to controller 400.

Figure 5:
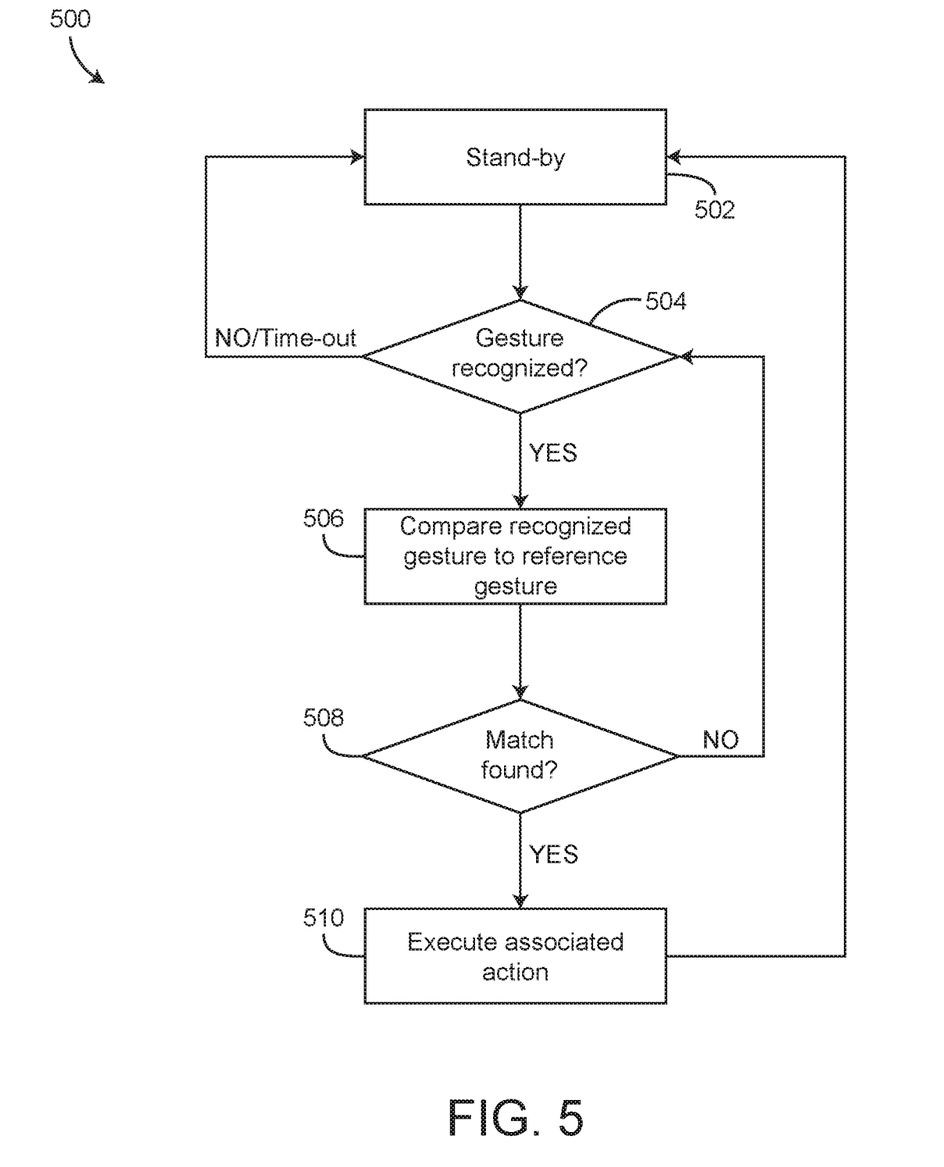
FIG. 5 is a flow diagram of a process for opening or closing a door of a display case in response to a user gesture, according to some embodiments.

Referring particularly to FIG. 5, a process 500 for operating a display case using gesture commands is shown, according to some embodiments. Process 500 includes steps 502-510 and may be performed by control system 300. In particular, process 500 can be performed by controller 400.

Process 500 includes operating the display case in a stand-by mode (step 502), according to some embodiments. Step 502 can be performed by controller 400 or by control signal generator 414. For example control signal generator 414 may generate control signals for various systems, sub-systems, apparatuses, etc., of the display case (e.g., refrigeration apparatus 200, lighting devices, etc.).

Process 500 includes determining if a gesture is recognized (step 504), according to some embodiments. Step 504 can include obtaining sensor data or sensor signal(s) from a gesture sensor (e.g., a camera, a capacitive proximity sensor, a 3d gesture sensor, an infrared sensor, etc.) and using the sensor data or sensor signal(s) to determine if a gesture has been performed by a customer in proximity of the display case. If the gesture is not recognized or a gesture is not recognized after a predetermined amount of time, (step 504, "NO"), process 500 returns to step 502. If a gesture is recognized (step 504, "YES"), process 500 proceeds to step 506. Step 504 may be performed by gesture recognition manager 408.

Process 500 includes comparing the recognized gesture to a reference gesture (step 506), according to some embodiments. Step 506 may be performed by gesture comparison manager 410. Step 506 can include retrieving one or more reference gestures from a reference gesture database (e.g., gesture database 412) and comparing the recognized or detected gesture to the reference gestures.

Process 500 includes determining if a match is found between the detected/recognized gesture and the reference gestures (step 508), according to some embodiments. In response to determining that the detected/recognized gesture does not match any of the reference gestures (step 508, "NO"), process 500 may return to step 504. In response to determining that the detected/recognized gesture matches one of the reference gestures, process 500 can proceed to step 510. Step 508 can be performed by gesture comparison manager 410 using the reference gesture(s) obtained from gesture database 412 and the detected gesture obtained from gesture sensor(s) 304.

Process 500 includes executing an action that is associated with the reference gesture (step 510) in response to determining that the detected gesture matches one of the reference gesture(s) (step 508, "YES"), according to some embodiments. Step 510 can include generating control signals for door actuator(s) 306 to perform the associated action. For example, the associated action may include opening or closing door 108 and the control signal(s) for door actuator(s) 306 may cause door actuator(s) 306 to open or close door 108 (or a corresponding one of doors 108). Step 510 can be performed by control signal generator 414 and door actuator(s) 306. In response to performing step 510, process 500 can return to step 502.

Detected Gestures

Figure 6:
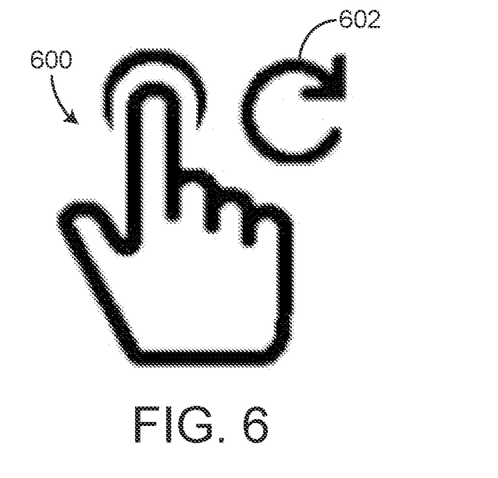
FIG. 6 is a diagram of a first door opening gesture that can be detected by the control system of FIGS. 3-4, according to some embodiments.
Figure 7:
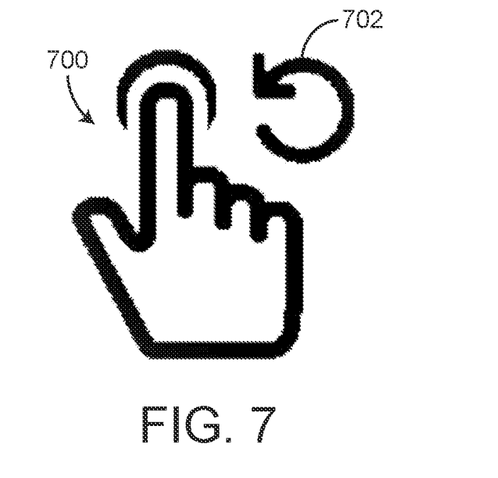
FIG. 7 is a diagram of a second door opening gesture that can be detected by the control system of FIGS. 3-4, according to some embodiments.
Figure 8:
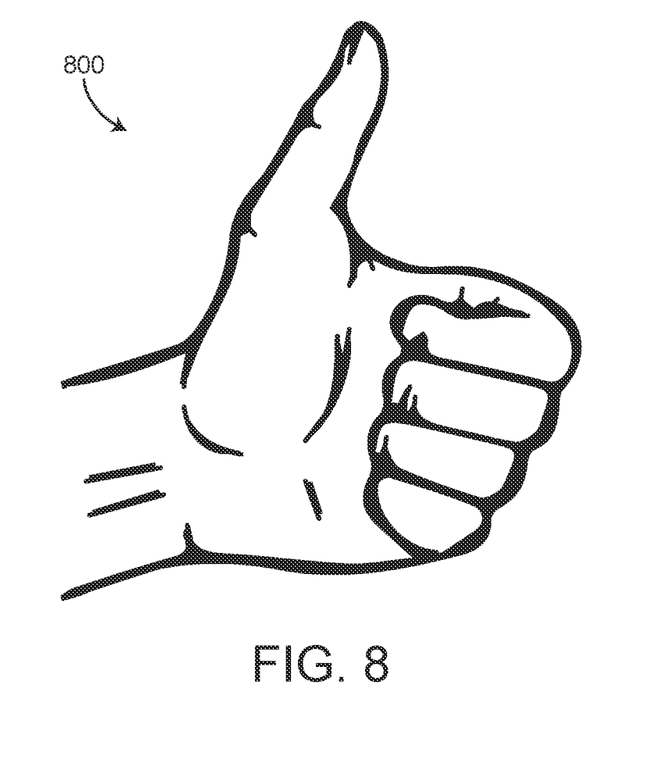
FIG. 8 is a diagram of a door closing gesture that can be detected by the control system of FIGS. 3-4, according to some embodiments.

Referring particularly to FIGS. 6-8, gesture sensor(s) 304 and controller 400 can be configured to detect or identify one or more door opening gestures (as shown in FIGS. 6-7) and one or more door closing gestures (as shown in FIG. 8). FIG. 6 shows a first door opening gesture 600 that may be detected (e.g., by gesture sensor(s) 304 and controller 400) and may result in door 108 being opened by door actuator(s) 306. First door opening gesture 600 may be a hand motion, a finger motion, etc., in a clockwise direction 602. For example, the customer may walk up to display case 100 (in proximity of gesture sensor(s) 304) and perform the first door opening gestures 700 by moving their hand or finger in clockwise direction 602 (e.g., in a circular motion). FIG. 7 shows a second door opening gesture 700 that may be detected (e.g., by gesture sensor(s) 304 and controller 400) and may result in door 108 being opened by door actuator(s) 306. Second door opening gesture 700 may be a hand motion or a finger motion (e.g., similar to first door opening gesture 600) in a counter-clockwise direction 702. The customer may perform second door opening gesture 700 which may be detected by gesture sensor(s) 304 and controller 400, thereby resulting in controller 400 operating door actuator(s) 306 to open door 108.

FIG. 8 shows a door closing gesture 800 that can be detected by gesture sensor(s) 304 and may be used to operate door actuator(s) 306 to close door 108. Door closing gestures 900 may be a thumbs-up hand motion (e.g., with a single hand, or with both hands) that results in door 108 being closed. For example, after a customer has opened door 108 (e.g., by performing one of first door opening gesture 600 or second door opening gesture 700) and accessed inner volume 110 of display case 100, the customer may perform door closing gesture 800 to close door 108. The door closing gesture 800 may also be a thumbs-up motion with both hands held or clasped together to trigger control system 300 to close the door 108.

Gesture Sensor(s)

Figure 9:
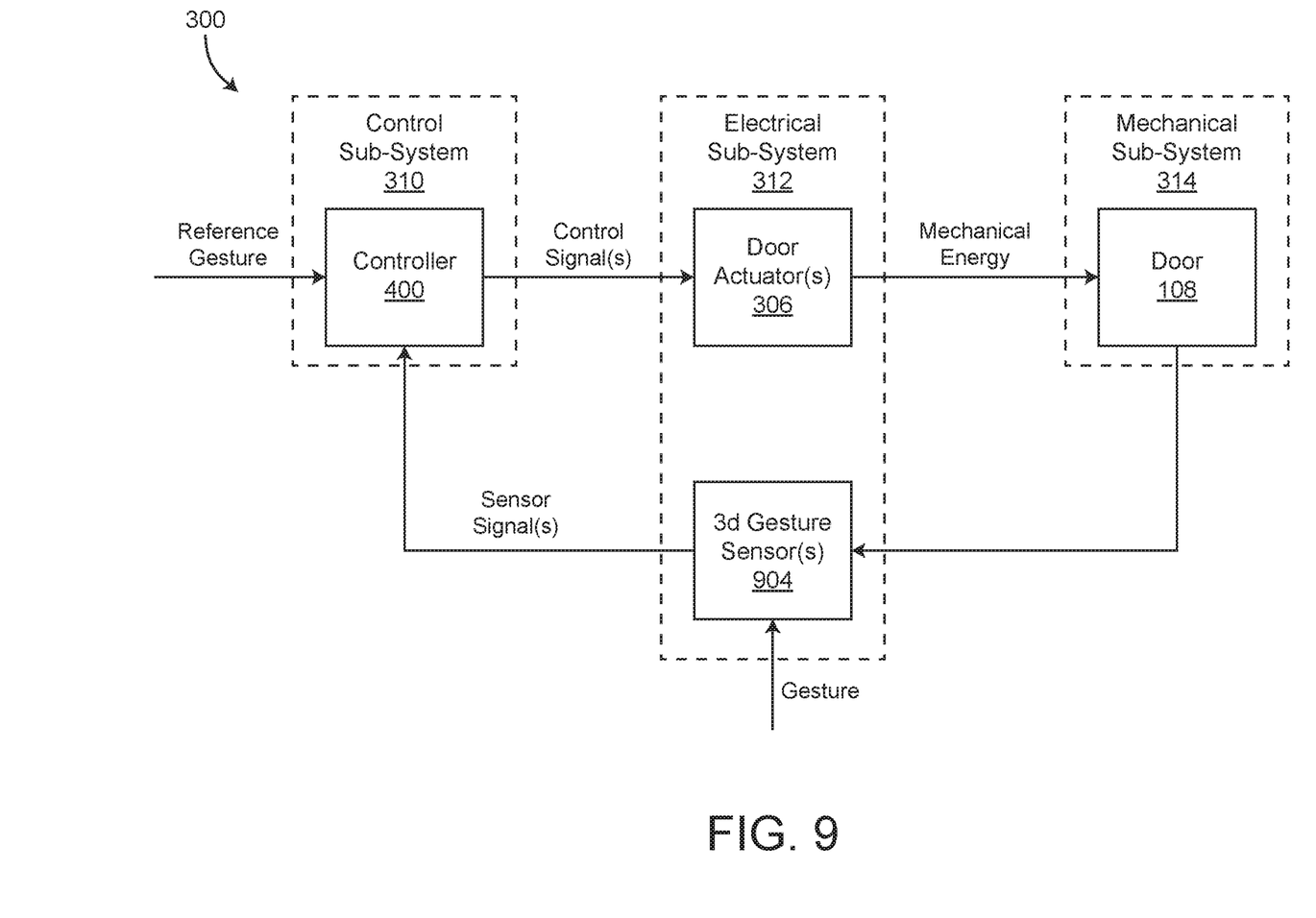
FIG. 9 is a block diagram of the control system of FIG. 3 configured with a 3d gesture sensor, according to some embodiments.
Figure 10:
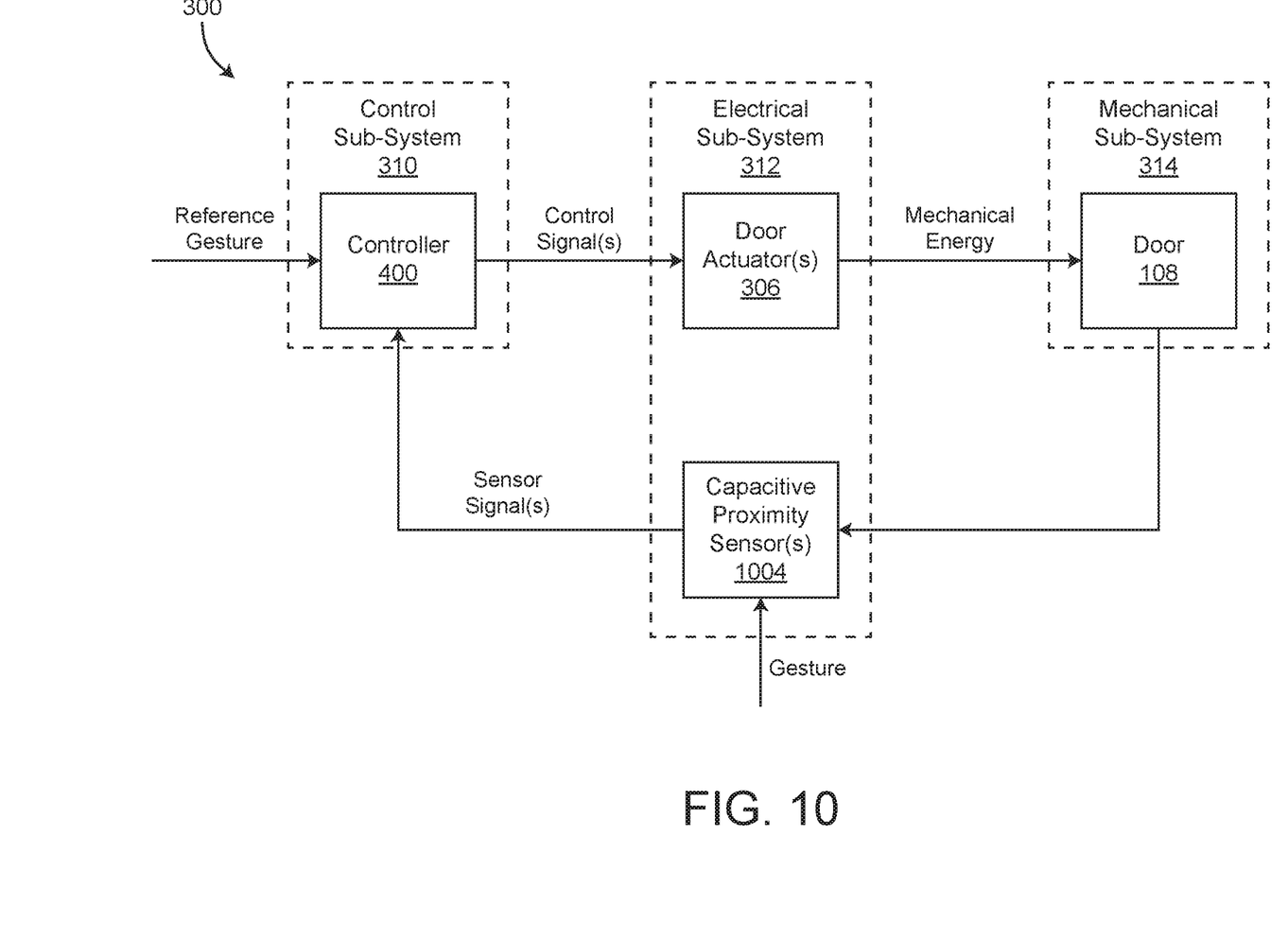
FIG. 10 is a block diagram of the control system of FIG. 3 configured with a capacitive proximity sensor, according to some embodiments.
Figure 11:
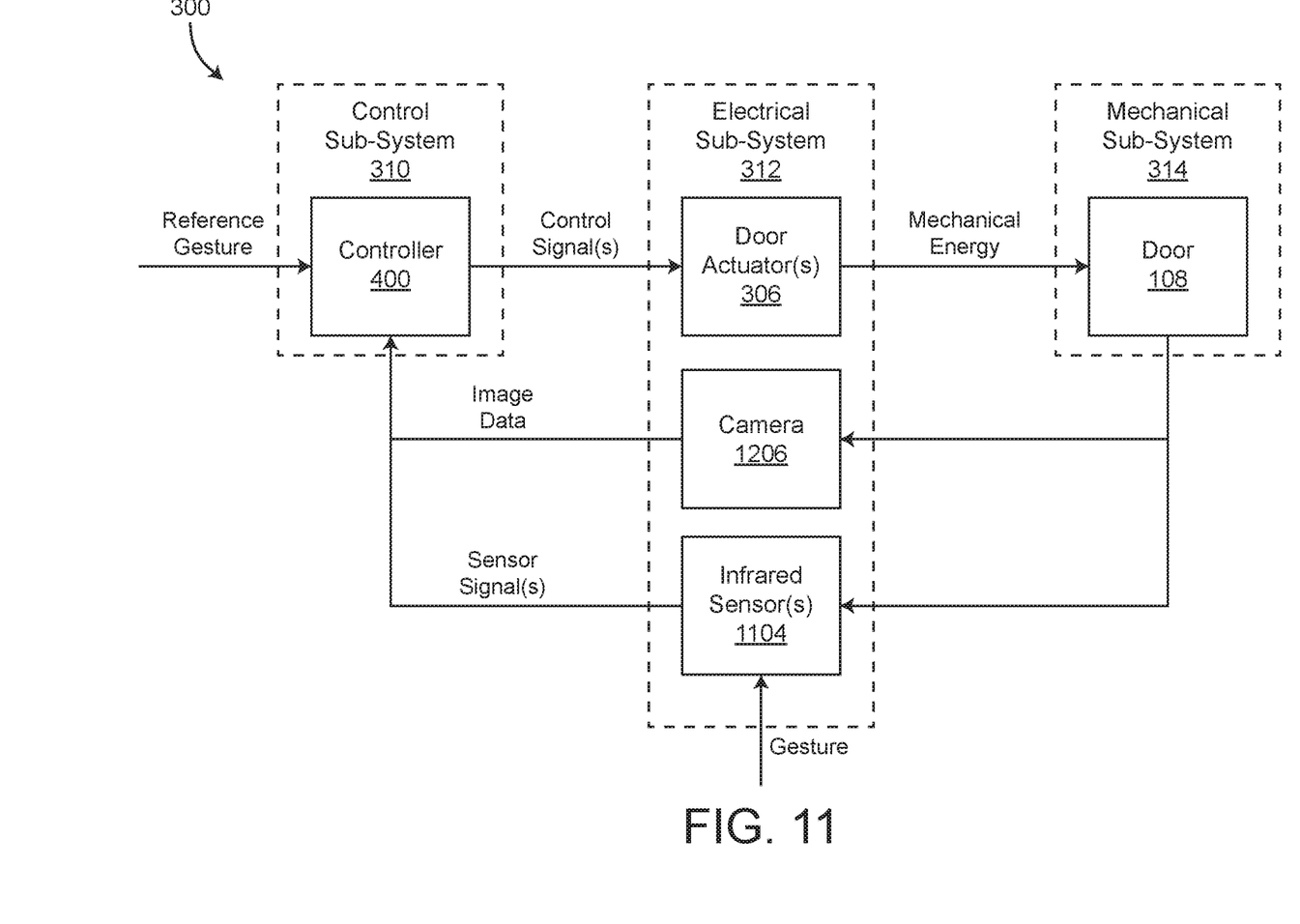
FIG. 11 is a block diagram of the control system of FIG. 3 configured with a camera and an infrared sensor, according to some embodiments.

Referring particularly to FIGS. 9-11, gesture sensor(s) 304 may be 3d gesture sensor(s) 904, capacitive proximity sensor(s) 1004, infrared sensor(s) 1104, or a camera 1206. Controller 400 may use different reference gesture(s) or different gesture databases 512 based on whether gesture sensor(s) 304 are 3d gesture sensor(s) 904, capacitive proximity sensor(s) 1004, or infrared sensor(s) 1104.

Referring particularly to FIG. 9, gesture sensor(s) 304 can be 3d gesture sensor(s) 904 that are configured to detect clockwise, counter or anti-clockwise, and circular hand motions or gestures within a range of 0 to 10 centimeters (cm) of 3d gesture sensor(s) 904. In some embodiments, using 3d gesture sensor(s) 904 facilitates using a single detection unit or sensor to detect gestures. When a customer attempts to open the door, the customer may perform first door opening gesture 600 or second door opening gesture 700, and 3d gesture sensor(s) 904 can detect the door opening gesture, which may function as a trigger to operate actuator(s) 306 to open door 108. Advantageously, using 3d gesture sensor(s) 904 can facilitate an accurate and cost-effective system or method for automatic door opening with negligible chances of false or improper opening of door 108.

Referring particularly to FIG. 9, gesture sensor(s) 304 can be capacitive proximity sensor(s) 1004 that are configured to detect non-metallic objects (e.g., human hands) within a detection range of 5 cm from capacitive proximity sensor(s) 1004. Since the human body has a high dielectric constant, capacitive proximity sensor(s) 1004 can detect human presence and may provide sensor signal(s) to controller 400 that trigger controller 400 and door actuator(s) 306 to open or close door 108. In some embodiments, two capacitive proximity sensor(s) 1004 are used to facilitate higher accuracy and reduce a likelihood of false triggers. For example, a first and second capacitive proximity sensor 1004 can be positioned on, mounted, or fixedly coupled on handle 124 of one of or all of doors 108. In some embodiments, the first capacitive proximity sensor 1004 is positioned on a first handle 124 of display case 100 while the second capacitive proximity sensor 1004 is positioned on a second handle 124 of display case 100 that is proximate, adjacent, or neighboring the first handle 124.

Referring particularly to FIG. 11, gesture sensor(s) 304 can be a camera 1206 and one or more infrared (IR) sensors 1104. Camera 1206 may be deployed with infrared sensor(s) 1104 to detect gestures, human presence, etc., and to generate image data for controller 400 to perform image recognition or gesture detection to determine if a user desires to access inner volume 110 or any of sub-volumes 130a-130f. In some embodiments, infrared sensor(s) 1104 are components or sensors of camera 1206. Infrared sensor(s) 1104 can be configured to detect gestures made by the customer and provide sensor signal(s) to controller 400. Camera 1206 can be configured to monitor an area with multiple refrigerated cases 100 or for multiple sub-sections (e.g., sub-volumes 130a-130f) of display case 100. For example, camera 1206 can monitor display case 100 for all six doors 108 to determine if a customer wishes to open any of doors 108. In some embodiments, control system 300 includes a camera 1206 associated with each door 108 or with each sub-volume 130a-130f. Controller 400, or more particularly, gesture recognition manager 408 and gesture comparison manager 410 can use an image processing technique and/or compare the image data obtained by camera 1206 to reference image data in gesture database 412 to determine if the customer has performed an action or gesture indicating the customer desires door 108 to be opened or closed. If controller 400 determines, based on the sensor signal(s) obtained from infrared sensor(s) 1104 or the image data of camera 1206, that the customer desires to open door 108, controller 400 may provide control signal(s) to door actuator(s) 306 to open door 108. Advantageously, using camera 1206 and infrared sensor(s) 1104 can facilitate improved accuracy in gesture detection and reduce a likelihood of false triggers and improperly opening door 108.

Automatic Door Closing

Referring again to FIG. 4, control signal generator 414 can operate door actuator(s) 306 to open door 108 (e.g., to transition door 108 between an open position and a closed position). In some embodiments, control signal generator 414 is configured to monitor an amount of time that door 108 is maintained in the open position. For example, control signal generator 414 may monitor an amount of elapsed time since door 108 was transitioned into the open position. In other embodiments, control signal generator 414 obtains sensor data from a door sensor (e.g., a distance sensor, a proximity sensor, a rotary potentiometer, etc.) to determine if door 108 is currently in the open position and to determine how long door 108 is maintained in the open position.

Control signal generator 414 can generate control signal(s) for door actuator(s) 306 to automatically transition door 108 back into the closed position if door 108 remains in the open position for a threshold amount of time. For example, control signal generator 414 may compare an amount of time $\Delta t_{door,open}$ that door 108 has been maintained in the open position to a corresponding threshold $\Delta t_{door,open,threshold}$. If the amount of time $\Delta t_{door,open}$ that door 108 has been maintained in the open position is equal to or greater than the corresponding threshold $\Delta t_{door,open,threshold}$ (e.g., $\Delta t_{door,open} \geq \Delta t_{door,open,threshold}$), control signal generator 414 may operate door actuator(s) 306 to close door 108 (e.g., to transition door 108 back into the closed position).

Control signal generator 414 can record a time, $t_{open}$, at which control signal(s) are provided to door actuator(s) 306 to open door 108 and can use a current time t and the time $t_{open}$ to each other to determine the amount of time $\Delta t_{door,open}$ that has elapsed since door 108 was opened. For example, the amount of time $\Delta t_{door,open}$ may be determined by control signal generator 414 or controller 400 using the Equation: $\Delta t_{door,open} = |t - t_{open}|$ where t is a current time, and $t_{open}$ is a time at which door 108 was transitioned into the open position.

Advantageously, automatically closing door 108 can reduce energy losses associated with heat transferring into display case 100 when door 108 is open. For example, if a customer opens door 108 (e.g., manually or by making a gesture that is detected by control system 300 and results in door 108 opening) but forgets to close door 108, heat may transfer into inner volume 110, thereby hindering or adversely affecting cooling efforts performed by refrigeration apparatus 200. Automatically closing door 108 can reduce an amount of time that door 108 is maintained in the open position and can reduce adverse heat transfer into inner volume 110 that may occur when door 108 is in the open position. Additionally, automatically closing door 108 ensures that door 108 will be closed even if the user or customer forgets to close door 108 after accessing inner volume 110.

Process

Figure 12:
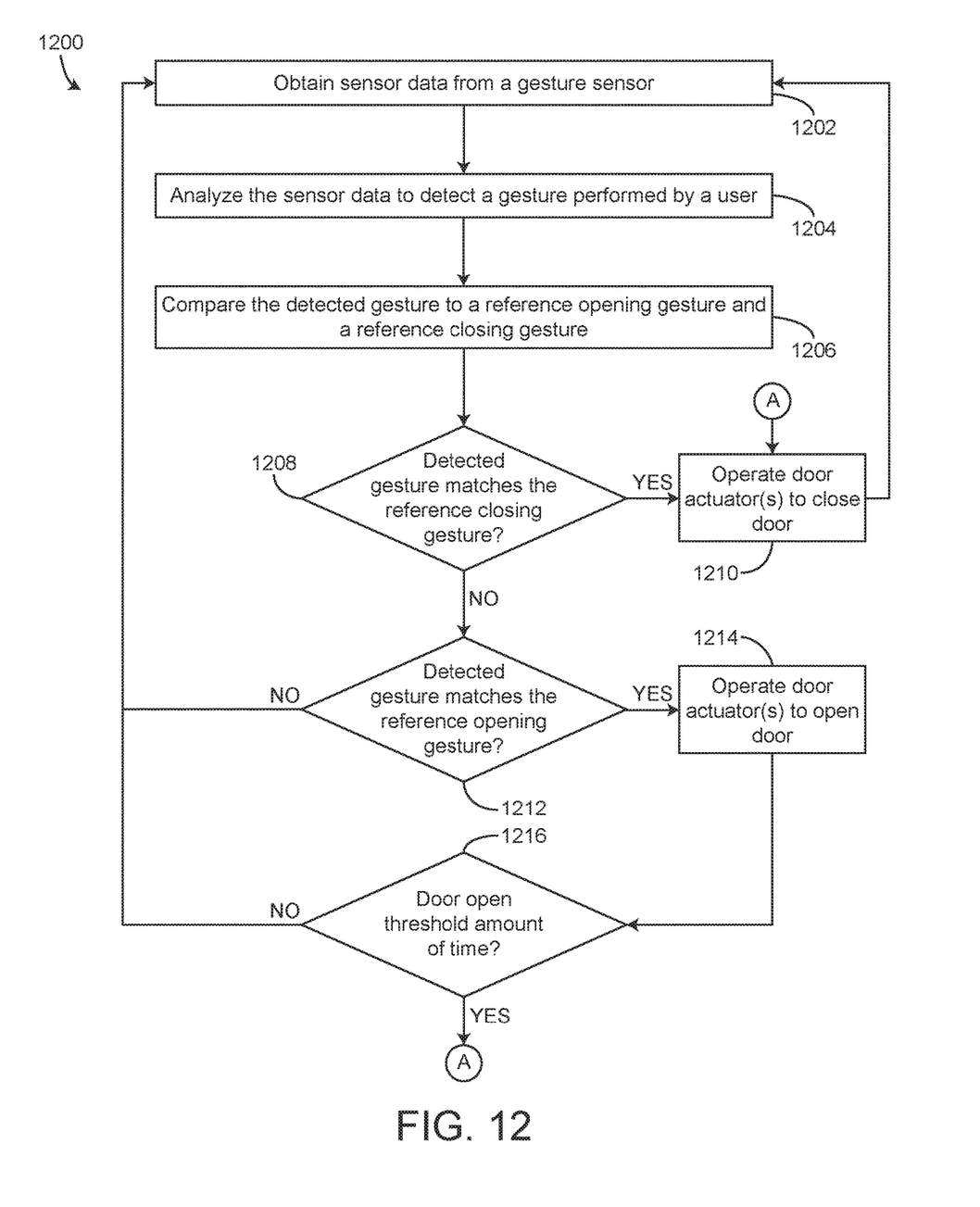
FIG. 12 is a flow diagram of a process for providing access to an inner volume of a display case in response to a gesture, according to some embodiments.

Referring particularly to FIG. 12, a process 1200 for automatically operating a display case based on a gesture to facilitate access to an inner volume or interior space of the display case is shown, according to some embodiments. Process 1200 includes steps 1202-1216 and can be performed by control system 300 or by controller 400 and display case 100.

Process 1200 includes obtaining sensor data from a gesture sensor (step 1202), according to some embodiments. The gesture sensor may be a single sensor or a collection of multiple sensors and can be positioned along an exterior surface of the display case. The gesture sensor may be configured to detect or measure a gesture that is performed by a customer or a user. The gesture sensor can be a camera, an infrared sensor, a capacitive proximity sensor, a 3d sensor, etc., or any combination thereof. If the display case includes multiple doors (e.g., multiple sub-sections), each door may be equipped with a corresponding sensor or a corresponding set of sensors. The sensor or sensors may provide the sensor data to a controller, a processor, a processing circuit, a processing unit, etc., of the display case (e.g., controller 400). Step 1202 can be performed by gesture sensor(s) 304.

Process 1200 includes analyzing the sensor data to detect a gesture performed by a user (step 1204), according to some embodiments. Step 1204 can be performed by gesture recognition manager 408. Step 1204 can include performing an image recognition technique (e.g., if the sensor data is image data) to identify or detect a gesture.

Process 1200 includes comparing the detected gesture to a reference opening gesture and a reference closing gesture (step 1206), according to some embodiments. Step 1206 can be performed by gesture comparison manager 410 using one or more reference gestures obtained from gesture database 412. The reference gestures can include one or more reference opening gestures (e.g., hand motions) and one or more reference closing gestures. Step 1206 can be performed by comparing sensor data obtained from when the user performs the gesture to sensor data associated with each of the one or more reference gestures (e.g. the reference opening gesture and the reference closing gesture) to identify if the gesture performed by the customer matches either of the reference opening gesture or the reference closing gesture.

Process 1200 includes determining if the detected gesture matches the reference closing gesture (step 1208), according to some embodiments. Step 1208 can be performed by gesture comparison manager 410. If the detected gesture matches the reference closing gesture (step 1208, "YES"), process 1200 proceeds to step 1210. If the detected gesture does not match the reference closing gesture (step 1208, "NO"), process 1200 proceeds to step 1212.

Process 1200 includes determining if the detected gesture matches the reference opening gesture (step 1212), according to some embodiments. Step 1212 can also be performed by gesture comparison manager 410 and may be performed concurrently or simultaneously with step 1208. If the detected gesture matches the reference opening gesture (step 1212, "YES"), process 1200 proceeds to step 1214. If the detected gesture does not match the reference opening gesture (step 1212, "NO") process 1200 returns to step 1202.

Process 1200 includes operating one or more door actuator(s) to close a door of the display case (step 1210), according to some embodiments. Step 1210 can be performed by control signal generator 414 and door actuator(s) 306. Step 1210 can include generating control signals for the one or more door actuator(s) so that the one or more door actuator(s) operate to close the door to restrict access to an inner volume of the display case. Step 1210 can be performed in response to a determination that the detected gesture matches the reference closing gesture (step 1208, "YES"). After process 1200 performs step 1210, process 1200 returns to step 1202.

Process 1200 includes operating the door actuator(s) to open the door of the display case (step 1214), according to some embodiments. Step 1214 can be similar to step 1210. Step 1214 can be performed by control signal generator 414 and door actuator(s) 306. Control signal generator 414 may generate control signals for door actuator(s) 306 to transition door 108 into the open position in response to a determination that the detected gesture matches the reference opening gesture (step 1212, "YES"). In response to performing step 1214, process 1200 may proceed to step 1216.

Process 1200 includes determining if the door has been opened a threshold amount of time (step 1216), according to some embodiments. In some embodiments, step 1216 is performed by control signal generator 414. Step 1216 can include monitoring an amount of time that has elapsed since performing step 1214 (e.g., when the door was transitioned into the open position). If the sensor data does not indicate that the customer has requested the door to be closed for the threshold amount of time (step 1216, "YES"), process 1200 can proceed to step 1210 to close the door. If the door has not been open for the threshold amount of time (step 1216, "NO"), process 1200 returns to step 1202.

Configuration of Exemplary Embodiments

The construction and arrangement of the temperature-controlled display device as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "first", "second", "primary," "secondary," "above," "below," "between," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the FIGURES may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A display case comprising:
a plurality of walls defining an inner volume;
a door transitionable between an open position for access to the inner volume and a closed position;
a door actuator configured to transition the door between the open position and the closed position;

a gesture sensor configured to detect a gesture performed by a user, the gesture sensor comprising a camera and an infrared sensor; and a controller comprising a processing circuit configured to perform operations comprising:

obtaining infrared gesture sensor data from the infrared sensor that indicates the gesture performed by the user;

determining that the user has performed a reference gesture using the infrared gesture sensor data;

obtaining image data from the camera that indicates the gesture performed by the user;

determining that the user has performed the reference gesture by comparing the image data to a reference image; and in response to both i) determining that the user has performed the reference gesture using the infrared gesture sensor data and ii) determining that the user has performed the reference gesture by comparing the image data to the reference image, operating the door actuator to transition the door between the open position and the closed position in response to determining that the user has performed the reference gesture.

2. The display case of claim 1, wherein the door actuator is an electric actuator or an electric motor.

3. The display case of claim 1, wherein the processing circuit is configured to perform operations comprising comparing the gesture detected by the gesture sensor to the reference gesture to determine that the user has performed the reference gesture.

4. The display case of claim 3, wherein comparing the gesture detected by the gesture sensor to the reference gesture comprises comparing the infrared gesture sensor data and the image data from the gesture sensor to sensor data and the reference image associated with the reference gesture to determine that the user has performed the reference gesture.

5. The display case of claim 1, wherein the processing circuit is configured to perform operations comprising:

determining that the user has performed a door opening gesture using the infrared gesture sensor data, the image data, and a door opening reference gesture; and operating the door actuator to transition the door into the open position in response to determining that the user has performed the door opening reference gesture.

6. The display case of claim 1, wherein the display case is a refrigerated display case comprising a refrigeration apparatus, wherein the controller is configured to perform operations comprising operating the refrigeration apparatus to provide cooling to the inner volume.

7. The display case of claim 1, wherein the processing circuit is configured to perform operations comprising automatically operating the door actuator to transition the door into the closed position in response to the door being in the open position for a threshold amount of time.

8. The display case of claim 1, wherein the gesture sensor further comprises a capacitive proximity sensor.

9. The display case of claim 8, wherein the capacitive proximity sensor is positioned proximal a door handle coupled to the door.

10. The display case of claim 9, wherein the capacitive proximity sensor is positioned on, mounted to, or fixably coupled on the door handle.

11. The display case of claim 9, wherein:
the door is a first door;
the door handle is a first door handle coupled to the first door;
the capacitive proximity sensor is a first capacitive proximity sensor positioned proximal the first door handle; and
the display case further comprises:
a second door;
a second door handle coupled to the second door; and
a second capacitive proximity sensor positioned proximal the second door handle.

12. The display case of claim 1, wherein:
the door comprises multiple doors; and
the gesture sensor comprises multiple cameras and multiple infrared sensors.

13. The display case of claim 12, wherein each of the multiple cameras is associated with a single door of the multiple doors.

14. The display case of claim 1, wherein the door comprises multiple doors, the camera is further configured to monitor the multiple doors.

15. The display case of claim 1, wherein the processing circuit is configured to perform operations comprising:

determining that the user has performed a door closing gesture using the infrared gesture sensor data, the image data, and a door closing reference gesture; and operating the door actuator to transition the door into the closed position in response to determining that the user has performed the door closing reference gesture.

16. A gesture-operated display case system comprising:
a display case comprising:
a plurality of walls defining an inner volume;
a door transitionable between an open position for access to the inner volume and a closed position;
a door actuator configured to transition the door between the open position and the closed position; and
a gesture sensor configured to detect a gesture performed by a user, the gesture sensor comprising a camera and an infrared sensor; and a controller comprising a processing circuit configured to perform operations comprising:

obtaining infrared gesture sensor data from the infrared sensor that indicates the gesture performed by the user;

determining that the user has performed a reference gesture using the infrared gesture sensor data;

obtaining image data from the camera that indicates the gesture performed by the user;

determining that the user has performed the reference gesture using the image data and a reference image; and in response to both i) determining that the user has performed the reference gesture using the infrared gesture sensor data and ii) determining that the user has performed the reference gesture using the image data and the reference image, operating the door actuator to transition the door between the open position and the closed position in response to determining that the user has performed the reference gesture.

17. The gesture-operated display case system of claim 16, wherein
the door actuator is an electric actuator or an electric motor.

18. The gesture-operated display case system of claim 16, wherein the processing circuit is configured to perform operations comprising comparing the gesture detected by the gesture sensor to the reference gesture to determine that the user has performed the reference gesture.

19. The gesture-operated display case system of claim 18, wherein comparing the gesture detected by the gesture sensor to the reference gesture comprises comparing the infrared gesture sensor data and the image data from the gesture sensor to sensor data associated with the reference gesture to determine that the user has performed the reference gesture.

20. The gesture-operated display case system of claim 16, wherein the processing circuit is configured to perform operations comprising:
determining that the user has performed a door opening gesture using the infrared gesture sensor data, the image data, and a door opening reference gesture; and
operating the door actuator to transition the door into the open position in response to determining that the user has performed the door opening reference gesture.

21. The gesture-operated display case system of claim 16, wherein the display case is a refrigerated display case comprising a refrigeration apparatus, wherein the controller is configured to perform operations comprising operating the refrigeration apparatus to provide cooling to the inner volume.

22. The gesture-operated display case system of claim 16, wherein the processing circuit is configured to perform operations comprising automatically operating the door actuator to transition the door into the closed position in response to the door being in the open position for a threshold amount of time.

23. The gesture-operated display case system of claim 16, wherein the processing circuit is configured to perform operations comprising:
determining that the user has performed a door closing gesture using the infrared gesture sensor data and a door closing reference gesture; and
operating the door actuator to transition the door into the closed position in response to determining that the user has performed the door closing reference gesture.

24. A method for providing access to an inner volume of a display case based on user gestures, the method comprising:
obtaining sensor data that indicates a gesture performed by a user, the sensor data comprising infrared gesture data from an infrared sensor and image data from a camera;
determining that the user has performed a reference gesture using the sensor data, wherein determining that the user has performed the reference gesture using the sensor data comprises:
obtaining the infrared gesture data and determining that the user has performed the reference gesture using the infrared gesture data and an infrared reference data; and
obtaining the image data and determining that the user has performed the reference gesture using the image data and a reference image; and
in response determining that the user has performed the reference gesture by both i) using the infrared gesture data and the infrared reference data and ii) using the image data and the reference image, operating a door actuator to transition a door of the display case between an open position and a closed position in response to determining that the user has performed the reference gesture.

25. The method of claim 24, wherein the sensor data is further obtained from
a 3d gesture sensory.

26. The method of claim 24, wherein determining that the user has performed the reference gesture using the sensor data comprises:
comparing the gesture detected to the reference gesture to determine if the user has performed the reference gesture.

27. The method of claim 24, wherein determining that the user has performed the reference gesture using the sensor data comprises:
comparing the sensor data from the infrared sensor and the camera to infrared sensor data and image data associated with the reference gesture to determine if the user has performed the reference gesture.

28. The method of claim 24, further comprising:
determining that the user has performed a door opening gesture using the sensor data and a door opening reference gesture; and
operating the door actuator to transition the door into the open position in response to determining that the user has performed the door opening reference gesture.

29. The method of claim 24, further comprising:
automatically operating the door actuator to transition the door into the closed position in response to the door being in the open position for a threshold amount of time.

30. The method of claim 24, further comprising:
determining that the user has performed a door closing gesture using the sensor data and a door closing reference gesture; and
operating the door actuator to transition the door into the closed position in response to determining that the user has performed the door closing reference gesture.

* * * * *

UNITED STATES PATENT AND TRADEMARK OFFICE
CERTIFICATE OF CORRECTION

| | | |
|---|---|---|
| PATENT NO. | : 11,678,750 B2 | Page 1 of 1 |
| APPLICATION NO. | : 16/826518 | |
| DATED | : June 20, 2023 | |
| INVENTOR(S) | : Harsha Mathur and Chetan Gundurao | |

It is certified that error appears in the above-identified patent and that said Letters Patent is hereby corrected as shown below:

In the Claims

Column 18, Line 8, Claim 24, after "response" insert -- to --.

Column 18, Line 19, Claim 25, delete "sensory." and insert -- sensor. --.

Signed and Sealed this
Seventeenth Day of October, 2023

*Katherine Kelly Vidal*

Katherine Kelly Vidal
*Director of the United States Patent and Trademark Office*